Jan. 24, 1956 R. C. PALMER 2,732,427

PULSE SEPARATING CIRCUIT

Filed Dec. 27, 1951

INVENTOR.
RICHARD C. PALMER

BY Darby & Darby

ATTORNEYS

United States Patent Office 2,732,427

Patented Jan. 24, 1956

2,732,427

PULSE SEPARATING CIRCUIT

Richard C. Palmer, Pompton Plains, N. J., assignor to Allen B. Du Mont Laboratories, Inc., Clifton, N. J., a corporation of Delaware Application December 27, 1951, Serial No. 263,593

7 Claims. (Cl. 178—69.5)

This invention relates to electrical circuits for separating signal voltages according to their wave forms. It relates in particular to the separation of horizontal and vertical synchronizing signals in a television system.

It is desirable to reduce as much as possible the bulk of the cables connecting television picture cameras to associated apparatus. One way in which this may be done is to increase the number of signals or the amount of simultaneous information which is carried by any one pair of wires in the cables; this is commonly known as a "multiplex" system. In order to do this, it is necessary that a circuit be provided to separate the multiplexed signals into their component parts.

It is an object of this invention to provide an improved signal-separating circuit. Another object is to provide an improved signal-separating circuit to allow a single signal, representing all of the horizontal and vertical blanking and driving pulses, to be transmitted from the control units to the television camera on a single pair of conductors. A further object is to provide a stabilized signal-separating circuit.

Figure 1:
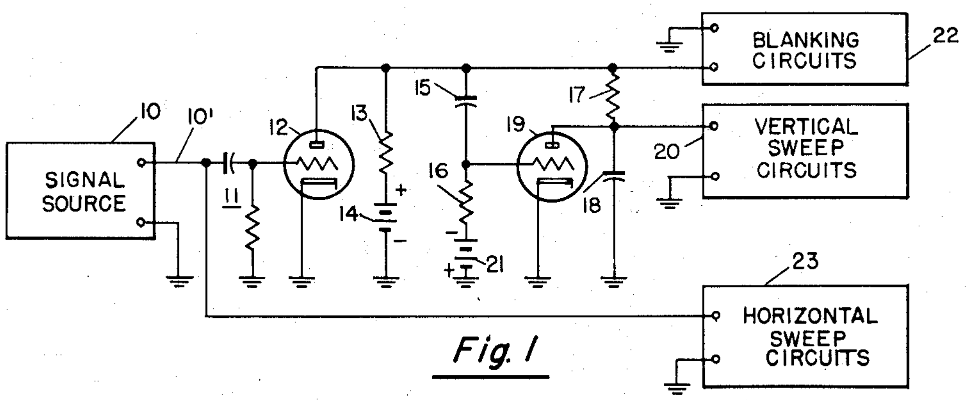

Other objects will be apparent from the following specification together with the drawings in which:

Fig. 1 shows in diagrammatic form a circuit embodying the invention;

Figs. 2 through 5 are graphical representations illustrating signal wave forms which occur in the operation of the circuit of Fig. 1 for a first type of field, such as an odd-line field in interlaced scanning, and Figs. 6 through 9 are graphical representations illustrating signal wave forms which occur for a second type of field such as an even-line field in interlaced scanning. The signals in Figs. 2 through 9 are shown on a comparative time-base and represent portions of fields in the vicinity of a vertical-retrace pulse.

Figures 2, 3, 4, 5, 6, 7, 8, 9:
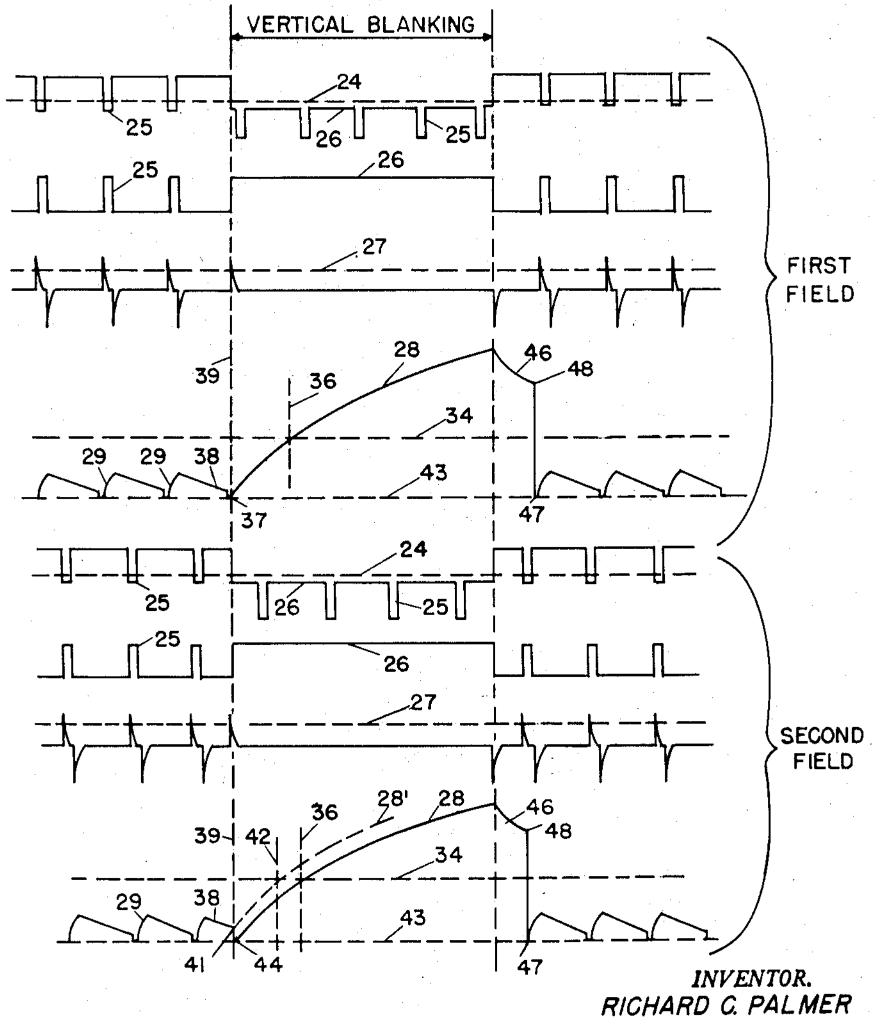

The invention comprises an electrical circuit which may be used in the television camera to separate a synchronizing input-signal wave form of the type shown in Figs. 2 and 6 into its separate parts for use in the appropriate circuits within the camera. This signal wave-form comprises a series of relatively short time-duration pulses 25 forming the horizontal blanking or synchronizing pulses for the camera. Added to each field represented by these fairly short pulses, is a relatively long pulse 26 which forms the vertical blanking or synchronizing signal for the camera. The horizontal and vertical blanking pulses, following separation thereof, are used as synchronizing impulses for the horizontal and vertical sweep circuits respectively.

The circuit comprises a signal source 10 having a pair of output terminals, one of which is shown as being grounded, and is coupled through a single conductor 10' to an amplifier tube 12 through a well-known resistance-capacitance input circuit 11; a grounded lead completes the circuit to the tube. The coupling 10' may comprise a shielded coaxial cable, if desired. The output circuit of the tube 12 comprises a load resistor 13 connected to a grounded voltage source 14, and a parallel circuit of two branches. The first of these branches comprises a condenser 15 and a resistor 16 connected in series as a differentiating circuit, this circuit having a bias voltage source 21 connected in series therewith. The second branch comprises a resistor 17 and a condenser 18 connected in series as an integrating circuit.

The input circuit of a clamping tube 19 is connected across the resistor 16. A vertical-sweep output circuit 20 is connected to the output electrode of the clamping tube 19 and directly across the condenser 18. A blanking circuit 22 is connected to the output circuit of the amplifier tube 12. Horizontal sweep circuits 23 are connected to the source 10 of signals.

The wave forms of the input signal voltage supplied by the source 10 is shown in Figs. 2 and 6; these two wave forms represent portions of alternate-line fields for an interlaced scanning system. Fig. 2 may represent odd-line fields, and Fig. 6 may represent even-line fields, or vice-versa. The signals of Figs. 2 and 6 appear one-at-a-time in repetitive sequence. It will be noted in the drawing, that the signals are represented with respect to the vertical blanking period for the two fields. Accordingly, the horizontal pulses 25 of the second field (Figs. 6–9) are displaced from the horizontal pulses 25 of the first field (Figs. 1–5) by a time-distance factor of one-half of the horizontal-pulse spacing. This is necessary in order to achieve proper interlacing of the two fields.

The negative peaks in the input signal below the dotted line 24, including some horizontal pulses, are clipped off and discharded by the amplifier tube 12. All of the horizontal pulses, however, are utilized in the horizontal sweep circuits 23. A portion of the output signal of the tube 12 across the load resistor 13 during the sequential fields is shown by the wave forms in Figs. 3 and 7. These wave forms are inverted with respect to the input wave forms due to action of the tube 12. This output signal, which comprises short horizontal blanking pulses 25 and longer vertical blanking pulses 26, is differentiated by the circuit comprising the condenser 15 and resistor 16 to form the voltage waves shown in Figs. 4 and 8; these voltage waves are applied to the grid of the clamping tube 19. The voltage of the bias source 21 is adjusted so that only the positive peaks of the wave forms of Figs. 4 and 8 above the dotted line 27 will cause the tube 19 to conduct.

Simultaneously, the signal voltage of Figs. 3 and 7 is integrated in the circuit comprising the resistor 17 and the condenser 18 to form the signal voltage shown in Figs. 5 and 9. During each of the relatively positive portions of the wave forms of Figs. 3 and 7, the condenser 18 is partially charged by voltage from the source 14, and, during the relatively negative portions of these wave forms, the condenser 18 partially discharges in a polarity direction toward the voltage level of the output electrode of the amplifier tube 12. During the time of the relatively long vertical-sync. pulse 26, the condenser 18 is charged to a higher voltage than it is during a horizontal-sync. pulse 25, as is shown by the vertical-signal charging curve 28 compared with the horizontal-signal charging curves 29.

When the condenser 18 charges during the vertical pulse, the voltage thereacross reaches a triggering level indicated by the dotted line 34. This is the level for actuation of the vertical sweep circuits 20 in the television camera. The desired timing of this triggering, in order to obtain proper interlacing, is shown by the dashed line 36.

In the first-field signal of Fig. 5, the vertical-signal charging curve 28 starts from a point 37 where the discharge curve 38 of the preceding horizontal-signal charging curve 29 intercepts the dashed line 39 which represents the leading edge of the vertical blanking pulse 26. The charging curve intercepts the triggering level 34 at the desired time 36. In the second-field signal of Fig. 9, the vertical-signal charging curve 28' would normally start to charge from a point 41 where the preceding horizontal-signal discharge curve 38 intercepts the line 39. This charging curve 28' would intercept the triggering level 34 at a time indicated by the dashed line 42, which is displaced from the required timing line 36.

The clamping tube 19 prevents this undesired displacement from occurring. As has been recited above, the clamping tube 19 is made conductive by the differentiated pulses shown in Figs. 4 and 8, at the beginning of each horizontal and vertical synchronizing pulse. Thus, the clamping tube 19 discharges the condenser 18 at the beginning of each synchronizing pulse so that it will always be charged from the same uniform reference potential 43. Accordingly, in the second field signal of Fig. 9, the horizontal discharge curve 38 is reduced to the reference potential 43 at the time-occurrence of the vertical-pulse leading edge 39, and the vertical charging curve 28 starts from the point 44 and intercepts the triggering level 34 at the desired timing 35.

At the trailing edge of the vertical sync.-pulse 28, the voltage on the condenser 18 begins to discharge along the line 46 until the next succeeding horizontal pulse occurs, whereupon the clamping tube 19 discharges the condenser 18 to the reference level 43 so that the succeeding horizontal charging voltage-wave will start charging from the point 47 rather than from the point 48. Thus, the clamping tube 19 performs a unique and desirable function during both horizontal pulses and vertical pulses, and insures that the condenser 18 will always begin charging from the same reference voltage-level 43, thus providing stable operation and freedom from "jitter." Stabilization is provided not only in the case of interlaced-scanning signals, but also in case of erratic changes in the power-supply voltages.

It will be obvious to those skilled in the art that the invention is not limited to the separation of signals in a television camera but may be used wherever synchronizing or other signals of the appropriate wave form must be separated; modifications may be made in the embodiment shown without departing from the scope of invention embraced in the following claims.

What is claimed is:

1. An electrical circuit for separating pulses in an interlaced television system, said circuit comprising a source of voltage pulses, some of said pulses being relatively long and others of said pulses being relatively short; an electrical differentiating network connected to said source to differentiate said voltage pulses; an integrating circuit comprising two elements in series, connected to said source to integrate said voltage pulses; a clamping circuit having an input and an output, said input being connected to be energized by the differentiated pulses from said differentiating circuit; and a connection between said output and one of said components in said integrating circuit to clamp the voltage thereacross to a predetermined reference level upon actuation of said clamping circuit by said differentiated pulses.

2. An electrical circuit for separating pulses in an interlaced television system, said circuit comprising a source of relatively long and relatively short electrical pulses in sequence; a differentiating circuit connected to said source to differentiate said voltage pulses; an integrating circuit comprising a condenser connected to said source to integrate said voltage pulses; a clamping circuit having an input and an output, said input being connected to said differentiating circuit to be energized by the differentiated pulses; and a connection between said output and said condenser to return the voltage thereacross to a predetermined reference level each time said clamping circuit is energized by said differentiated pulses.

3. An electrical circuit for separating pulses in an interlaced television system, said circuit comprising a source of relatively long and relatively short voltage pulses; a differentiating circuit connected to said source to differentiate said voltage pulses; an integrating circuit connected to said source to integrate said voltage pulses, said integrating circuit comprising a condenser; a clamping circuit comprising a tube having an input and output circuit; said input circuit being connected to said differentiating circuit to be energized thereby and a connection between said output circuit and said condenser to clamp the voltage across said condenser to a predetermined fixed level each time said input circuit is energized by said differentiating circuit.

4. An electrical circuit comprising a source of relatively long and relatively short voltage pulses; a differentiating circuit connected to said source to differentiate said voltage pulses; an integrating circuit connected to said source to integrate said voltage pulses, said integrating circuit comprising a condenser; a clamping circuit comprising a tube having an input and an output circuit for separating pulses in an interlaced television system, said circuit, said input circuit being connected to said differentiating circuit to be energized by the differentiated voltage pulses therefrom; a bias voltage source connected in series with said input circuit to cause said tube to conduct only during positive peaks of said differentiated pulses; and a connection between said output circuit of said tube and said condenser to clamp the voltage across said condenser to a predetermined reference level each time said tube is rendered conductive.

5. An electrical circuit for separating pulses in an interlaced television system, said circuit comprising a source of relatively long and relatively short voltage pulses, an amplifier tube having an input circuit connected to said source of voltage pulses; a load resistor connected to an output circuit of said amplifier tube; a differentiating circuit comprising a condenser and resistor in series connected to the junction of said load resistor and said output circuit; an integrating circuit comprising a second resistor and a second condenser connected effectively in parallel with said differentiating circuit; and a clamping tube circuit comprising an input circuit connected to said differentiating circuit to be energized by the differentiating pulses therefrom and an output circuit connected to said integrating circuit to return the voltage across said second condenser to a predetermined level each time said clamping circuit is energized by said differentiated pulses.

6. In a television system, a source of mixed vertical and horizontal synchronizing signals, a horizontal sweep circuit connected to said source to be energized thereby, an amplifier tube comprising an output electrode and an input electrode connected to said source to be energized thereby and biased to remove peak amplitudes of said signals, a blanking circuit connected to said output electrode to be energized thereby, a differentiating circuit connected to said output electrode to be energized thereby, an integrating circuit connected to said output electrode to be energized thereby, a vertical sweep circuit connected to said integrating circuit to be energized thereby, and a clamping tube having an input electrode connected to said differentiating circuit to be energized by the differentiated pulses therefrom, an output electrode, and a connection between said integrating circuit to clamp the output voltage thereof to a predetermined level each time said clamping tube is energized by one of said differentiated pulses.

7. In a television system, a source of mixed and successive relatively long and relatively short voltage pulses; a differentiating circuit having an input and an output, said input being connected to said source; an integrating circuit having an input and an output, the latter said input being connected to said source; and a clamping circuit having an input and an output, the input of said clamping circuit being connected to the output of said differentiating circuit to be energized by the differentiated pulses therefrom and a connection between the output of said clamping circuit and the output of said integrating circuit to maintain the voltage thereacross at a predetermined level each time said clamping circuit is energized by one of said differentiated pulses.

References Cited in the file of this patent

UNITED STATES PATENTS

| | | |
|---|---|---|
| 2,508,923 | Mautner | May 23, 1950 |
| 2,535,247 | White | Dec. 26, 1950 |
| 2,566,832 | Grundmann | Sept. 4, 1951 |
| 2,570,775 | De Baun | Oct. 9, 1951 |
| 2,611,033 | Jones | Sept. 16, 1952 |